US009595364B2

(12) United States Patent
Jung et al.

(10) Patent No.: US 9,595,364 B2
(45) Date of Patent: Mar. 14, 2017

(54) CONDUCTIVE SHEET COMPOSITION

(71) Applicant: Samsung SDI Co., Ltd., Yongin-si (KR)

(72) Inventors: Eun Hye Jung, Uiwang-si (KR); Chan Gyun Shin, Uiwang-si (KR); Jong Cheol Lim, Uiwang-si (KR); Nam Hyun Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 154 days.

(21) Appl. No.: 14/340,709

(22) Filed: Jul. 25, 2014

(65) Prior Publication Data

US 2015/0028266 A1 Jan. 29, 2015

(30) Foreign Application Priority Data

Jul. 26, 2013 (KR) ........................ 10-2013-0088484

(51) Int. Cl.
*H01B 1/24* (2006.01)
*H01B 1/04* (2006.01)
*C08L 69/00* (2006.01)

(52) U.S. Cl.
CPC ...................................... *H01B 1/24* (2013.01)

(58) Field of Classification Search
CPC ... H01B 1/02; H01B 1/04–1/24; B82Y 30/00; C08L 69/00; C08L 51/04
USPC .................... 252/500–519.1, 500–511, 518.1
See application file for complete search history.

(56) References Cited

U.S. PATENT DOCUMENTS 8,148,456 B2 4/2012 Aoki et al.
2007/0010635 A1* 1/2007 Chen ....................... C08L 83/10 525/476
2007/0135570 A1* 6/2007 Krishnamurthy ....... C08L 69/00 525/67
2007/0135589 A1 6/2007 Derudder et al.
2008/0009576 A1* 1/2008 Alexander ............ B29C 45/542 524/407
2008/0246181 A1* 10/2008 Zhu ........................ B82Y 30/00 264/239
2010/0080632 A1* 4/2010 Oki .................... G03G 15/0131 399/308
2011/0054107 A1 3/2011 Hayata et al.
2011/0060106 A1* 3/2011 de Kraker ............... C08L 69/00 525/101
2011/0204298 A1 8/2011 Chang et al.
2011/0245388 A1* 10/2011 Monden ................... C08K 5/42 524/161
2012/0097194 A1* 4/2012 McDaniel .............. A01N 63/02 134/26

FOREIGN PATENT DOCUMENTS

| | | | | |
|---|---|---|---|---|
| CN | 101336274 A | | 12/2008 | |
| CN | 101679739 A | | 3/2010 | |
| CN | 101778894 A | | 7/2010 | |
| CN | 102250460 | * | 5/2011 | ......... B29C 47/0011 |
| CN | 102250460 A | | 11/2011 | |
| CN | 102585469 A | | 7/2012 | |
| KR | 0695503 | | 6/2005 | |
| KR | 10-2008-0080116 A | | 9/2008 | |
| KR | 10-2012-0078417 A | | 7/2012 | |
| TW | 200734397 | | 9/2007 | |
| WO | 2008/020579 | | 2/2008 | |

* cited by examiner

*Primary Examiner* — Tri V Nguyen

(74) *Attorney, Agent, or Firm* — Additon, Higgins & Pendleton, P.A.

(57) ABSTRACT

Provided is a conductive sheet composition including a polycarbonate resin, a rubber-modified vinyl-based graft copolymer, carbon nanotube, and a silicone particle to improve conductivity and mechanical physical properties and reduce surface gloss.

5 Claims, No Drawings

CONDUCTIVE SHEET COMPOSITION

CROSS-REFERENCE TO RELATED APPLICATIONS

This application claims priority under 35 U.S.C. §119 to Korean Patent Application No. 10-2013-0088484, filed on Jul. 26, 2013, in the Korean Intellectual Property Office, the disclosure of which is incorporated herein by reference in its entirety.

FIELD OF THE INVENTION

The present invention relates to a conductive sheet composition. In exemplary embodiments, the conductive sheet composition can have excellent conductivity and mechanical physical properties and reduced surface gloss.

BACKGROUND

There has been a focus on conductive polymers as novel materials for use in various electronic industry fields such as electronic components, semiconductors, displays, automobiles, satellite communications, and the like. The importance thereof has emerged with the rapid development of the IT industry.

In general, since a polymer material is an electric insulator, static charges accumulate on a surface of the polymer material when processed or used. The accumulation of the static charges can damage electronic devices by short-circuit, and/or the static charges accumulated on the surface can attract dust, which can cause serious problems when used in a semiconductor, and the like.

Malfunction caused by the above-described electrostatic problems frequently occurs at the time of mounting integrated electronic circuits and core components related therewith as a result of pollution due to generation of static electricity, dust, and the like. Accordingly, there is an increased need to prevent electrification and manage pollution sources such as dust and harmful substance.

Precision electronic components such as semiconductor integrated circuit chips and/or various modules, and the like, can be transported by an antistatic container to prevent the components from being damaged by static electricity generated during transportation. For example, when a tray is used as an electronic component transportation container, static charges can accumulate on a surface of the tray, due to friction with the components or contact with some parts of human body during transport or handling. Since the surface charges cause electrostatic damage, there is a demand for properly discharging the surface charges to protect the electronic components.

Accordingly, to provide conductivity to a sheet used in electronics industry field, conductive additives or filler can be added to a composition or a conductive polymer can be used. For example, metallic fiber, metallic powder, inherently dissipative polymer (IDP) which is an organic material having electric conductivity, or carbon black can be used. However, when using an IDP, the sheet may exhibit surface resistance and have a low conductivity of which the maximum is about $10^9$ to $10^{10}$ ohm/sq. In a case of carbon black, high surface resistance at a range of $10^4$ to $10^6$ ohm/sq may be shown. However, the carbon black generates dust, which can negatively affect the environment and decrease reliability of a product due to deterioration in mechanical physical properties such as impact strength, elongation, and the like. In addition, an excessive amount of carbon black is required to maintain conductivity.

Korean Patent No. 0695503 is directed to the manufacture of a film having conductivity by including conductive fillers such as carbon black, and the like, on an outer surface layer of a multi-layer film. However, the manufacture of the film can be complicated, inefficient, and not cost effective.

International Patent Publication No. WO 2008-020579 is directed to a conductive resin composition for decreasing pollution of electronic components and having excellent close adhesion with a cover tape, the conductive resin composition containing carbon black. However, the conductive resin composition can generate dust on a surface of the composition, generate errors in a sensor due to surface gloss, and can generate pollution, by containing an excessive amount of carbon black.

Therefore, there is a need for technology for overcoming the above-described problems.

SUMMARY

An embodiment of the present invention is directed to providing a conductive sheet composition capable of having excellent mechanical physical properties and conductivity and reducing surface gloss to prevent malfunction of a sensor at the time of being applied to a module in a manufacturing process of various precision electronic products.

Another embodiment of the present invention is directed to providing a conductive sheet composition capable of having mechanical physical properties such as impact strength, elongation, and the like, and high surface resistance, and implementing an extinction effect. Another embodiment of the present invention is directed to providing a molded article including a conductive sheet or a film capable of improving reliability at the time of being applied to an electronic industry process.

In one general aspect, there is provided a conductive sheet composition including: a polycarbonate resin (A), a rubber-modified vinyl-based graft copolymer (B), carbon nanotube (C), and a silicone particle (D).

The conductive sheet composition may include about 1 to about 10 parts by weight of the rubber-modified vinyl-based graft copolymer (B), about 0.5 to about 5 parts by weight of the carbon nanotube (C), and about 0.5 to about 5 parts by weight of the silicone particle (D), each based on about 100 parts by weight of the polycarbonate resin (A).

The carbon nanotube (C) may have an average diameter of about 0.5 to about 100 nm and an average length of about 0.01 to about 100 μm.

The silicone particle (D) may be polyalkylsilsesquioxane.

The silicone particle (D) may have an average particle size of about 0.1 to about 10 μm.

The polycarbonate resin (A) may have a weight average molecular weight (Mw) of about 10,000 to about 200,000 g/mol.

The rubber-modified vinyl-based graft copolymer (B) may be prepared by graft polymerization of a monomer mixture including a rubber polymer, an aromatic vinyl compound and a vinyl cyanide compound.

The rubber-modified vinyl-based graft copolymer (B) may be an acrylonitrile butadiene styrene (ABS) graft copolymer.

In another embodiment, there is provided a molded article including a conductive sheet manufactured using the conductive sheet composition as described above.

DETAILED DESCRIPTION OF EMBODIMENTS

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Herein, unless technical and scientific terms used herein are defined otherwise, they have meanings generally understood by those skilled in the art to which the present invention pertains. Description for known functions and components which may unnecessarily obscure the gist of the present invention in the following description will be omitted.

The present inventors studied to develop a conductive sheet composition capable of having excellent conductivity and mechanical physical properties and reducing surface gloss to thereby prevent malfunction at the time of being applied to a process of manufacturing electronic products. As a result, the inventors surprisingly found that a composition including a polycarbonate resin, a rubber-modified vinyl-based graft copolymer, carbon nanotube and a silicone particle is capable of improving conductivity and reducing surface gloss even at a small amount of carbon nanotube with minimal or no deterioration of mechanical physical properties, thereby completing the present invention.

The conductive sheet composition of the present invention includes a polycarbonate resin (A), a rubber-modified vinyl-based graft copolymer (B), carbon nanotube (C) and a silicone particle (D).

Hereinafter, each component is described in more detail.

(A) Polycarbonate Resin

The polycarbonate resin (A) according to the present invention may be prepared by reacting a diphenol-based compound represented by the following Chemical Formula 1 with phosgene, halogen formate or carbonic acid diester:

[Chemical Formula 1]

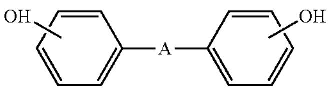

In Chemical Formula 1, A represents a single bond, $C_1$ to $C_5$ alkylene, $C_1$ to $C_5$ alkylidene, $C_5$ to $C_6$ cycloalkylidene, —S— or —$SO_2$—.

Specific examples of the diphenol-based compound represented by Chemical Formula 1 above may include, but are not necessarily limited to, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. In addition, compounds such as hydroquinone and/or resorcinol may be used as the diphenol-based compound. In exemplary embodiments, bisphenol-based compounds such as 2,2-bis-(4-hydroxyphenyl)-propane, 2,2-bis-(3,5-dichloro-4-hydroxyphenyl)-propane, 1,1-bis-(4-hydroxyphenyl)-cyclohexane, and the like, and mixtures thereof, can be used, for example, 2,2-bis-(4-hydroxyphenyl)-propane referred to as bisphenol-A can be used.

As the polycarbonate resin (A), a linear polycarbonate resin, a branched polycarbonate resin, or a mixture of the linear and branched polycarbonate resins, in view of a structure, may be used, but the present invention is not limited thereto.

As the linear polycarbonate resin, a bisphenol A-based polycarbonate resin may be used. As the branched polycarbonate resin, a mixture prepared by adding a compound having 0.05 to 2 mol % of tri- or more polyfunctional compound, for example a compound having trivalent or more phenolic groups, with respect to the total amount of the diphenol-based compound, may be used.

The polycarbonate resin (A) according to the present invention can have a weight average molecular weight (Mw) ranging from about 10,000 to about 200,000 g/mol, for example, about 15,000 to about 80,000 g/mol. When satisfying the above-described range of the weight average molecular weight, mechanical physical properties, conductivity, and synergistic effect of extinction may be implemented.

In the present invention, the weight average molecular weight was measured by dissolving a powder sample in THF and using Gel Permeation Chromatography (GPC; lient Technologies 1200 series). Shodex LF-804 (8.0.1.D.×300 mm) was used as a column, polystyrene (Shodex Co.) was used as a standard sample.

(B) Rubber-Modified Vinyl-Based Graft Copolymer

The rubber-modified vinyl-based graft copolymer (B) according to the present invention may be prepared by graft polymerization of a monomer mixture including a rubber polymer, an aromatic vinyl compound and a vinyl cyanide compound.

In exemplary embodiments, the rubber-modified vinyl-based graft copolymer may include the following amounts of components: about 40 to about 70 wt % of the rubber polymer and about 30 to about 60 wt % of the vinyl-based monomer, wherein the vinyl-based monomer may include about 60 to about 90 wt % of the aromatic vinyl compound and about 10 to about 40 wt % of the vinyl cyanide compound, based on 100 wt % of the vinyl-based monomer.

Examples of the rubber polymer may include without limitation polybutadiene rubbers, acrylic rubbers, ethylene/propylene rubbers, styrene/butadiene rubbers, acrylonitrile/butadiene rubbers, isoprene rubbers, acryl-based rubbers, ethylene-propylene-diene terpolymers (EPDM), polyorganosiloxane/polyalkyl (meth) acrylate rubber composites, and the like, and mixtures of two or more selected therefrom. In exemplary embodiments, polybutadiene rubber may be used.

The rubber polymer may have an average particle size of 0.05 to 0.5 μm. In the above-described range, compatibility with other components can be excellent while having proper impact strength and elongation strength. In exemplary embodiments, the rubber polymer may have an average particle size of 0.2 to 0.35 μm.

In the present invention, the average particle size, which is measured using a length on a picture of a target particle taken by TEM, means an average value of 100 target particles.

Examples of the aromatic vinyl compound may include without limitation styrene, α-methyl styrene, halogen and/or C1-C10 alkyl-substituted styrene, and the like, and mixtures thereof. In exemplary embodiments, styrene may be used.

Examples of the vinyl cyanide compound may include without limitation acrylonitrile, methacrylonitrile, and the like, and mixtures thereof. In exemplary embodiments, acrylonitrile may be used.

In addition, the graft polymerization may be conducted by further adding one or more other monomers such as but not limited to $C_1$ to $C_8$ methacrylic acid alkyl esters, $C_1$ to $C_8$ acrylic acid alkyl esters, maleic anhydride, and the like, and mixtures thereof. The $C_1$ to $C_8$ methacrylic acid alkyl esters and/or $C_1$ to $C_8$ acrylic acid alkyl esters, which are alkyl esters of methacrylic acid or acrylic acid, respectively, are esters obtained from monohydric alcohol having 1 to 8 carbon atoms. Specific examples thereof may include without limitation methacrylic acid methyl ester, methacrylic acid ethyl ester, methacrylic acid propyl ester, acrylic acid ethyl ester, acrylic acid methyl ester, and the like, and mixtures thereof.

As the rubber-modified vinyl-based graft copolymer (B), a material obtained by graft copolymerization of styrene, acrylonitrile and optionally (meth) acrylic acid alkyl ester monomer as a mixture form on a polybutadiene rubber, an acrylic rubber, or a styrene/butadiene rubber, and for example, an acrylonitrile butadiene styrene (ABS) graft copolymer may be used.

In the present invention, the conductive sheet composition may include the rubber-modified vinyl-based graft copolymer (B) in an amount of about 1 to about 10 parts by weight based on about 100 parts by weight of the polycarbonate resin (A). Preferably, the rubber-modified vinyl-based graft copolymer (B) may be contained in an amount of about 2 to about 8 parts by weight. In some embodiments, the conductive sheet composition may include the rubber-modified vinyl-based graft copolymer (B) in an amount of about 1, 2, 3, 4, 5, 6, 7, 8, 9, or 10 parts by weight. Further, according to some embodiments of the present invention, the amount of the rubber-modified vinyl-based graft copolymer (B) can be in a range from about any of the foregoing amounts to about any other of the foregoing amounts.

(C) Carbon Nanotubes

The carbon nanotubes (C) according to the present invention are capable of increasing conductivity even at a small amount with minimal or no deterioration of mechanical physical properties, by a combination with other components of the composition, and in particular, by a combination with silicone particles, the carbon nanotubes may impart excellent conductivity and express a synergistic effect that surface gloss may be reduced.

Examples of the carbon nanotubes (C) may include without limitation single-walled carbon nanotubes, double-walled carbon nanotubes, multi-walled carbon nanotubes, rope carbon nanotubes, and the like, and mixtures thereof, In exemplary embodiments, multi-walled carbon nanotubes can be used due to their relatively low cost and high degree of purity.

The carbon nanotubes (C) may have a diameter of about 0.5 nm to about 100 nm and a length of about 0.01 to about 100 μm. In this case, the carbon nanotubes may be easily dispersed in the composition, such that electrical conductivity may be improved even at a low content by network between carbon nanotubes, and due to combination with other components, mechanical physical properties may be improved, and a synergistic effect such as an extinction effect, or the like, may be shown.

In the present invention, the conductive sheet composition may include the carbon nanotubes (C) in an amount of about 0.5 to about 5.0 parts by weight based on about 100 parts by weight of the polycarbonate resin (A). More preferably, the carbon nanotubes (C) may be contained in an amount of about 1 to about 3 parts by weight. In some embodiments, the conductive sheet composition may include the carbon nanotubes (C) in an amount of about 0.5, 0.6, 0.7, 0.8, 0.9, 1, 2, 3, 4, or 5 parts by weight. Further, according to some embodiments of the present invention, the amount of the carbon nanotubes (C) can be in a range from about any of the foregoing amounts to about any other of the foregoing amounts.

When the amount of the carbon nanotubes is outside of the range above, surface resistance and mechanical physical properties may be deteriorated and it can be difficult to express a synergistic effect with other components.

(D) Silicone Particle

The silicone particle (D) of the present invention may have excellent compatibility with other components in the composition, impart an extinction effect and reduce surface gloss.

The conductive sheet composition may include the silicone particles (D) in an amount of about 0.5 to about 5.0 parts by weight based on about 100 parts by weight of the polycarbonate resin (A). More preferably, the silicone particles (D) may be contained in an amount of about 1 to about 3 parts by weight. In some embodiments, the conductive sheet composition may include the silicone particles (D) in an amount of about 0.5, 0.6, 0.7, 0.8, 0.9, 1, 2, 3, 4, or 5 parts by weight. Further, according to some embodiments of the present invention, the amount of the silicone particles (D) can be in a range from about any of the foregoing amounts to about any other of the foregoing amounts.

When an amount of the silicone particle is outside of the range above, it can be difficult to reduce surface gloss, and mechanical physical properties such as conductivity, impact strength, and the like, may be deteriorated.

The silicone particle (D) may include a polyalkylsilsesquioxane particle. The polyalkylsilsesquioxane is polyorganosiloxane having trifunctional siloxane unit (hereinafter, referred to as T unit) represented by $R_3SiO_{0.5}$, wherein R is a trivalent organofunctional group. The silicone particle (D) may include about 90 mol % or more, for example about 95 mol % or more, and as another example 100 mol % of the polyalkylsilsesquioxane unit based on 100 mol % of the total siloxane unit (the total siloxane unit including M unit, D unit, T unit, Q unit). The M unit represents monofunctional siloxane unit represented by $R_3SiO_{0.5}$, wherein R is a monovalent organofunctional group, the D unit represents difunctional siloxane unit represented by $R_2SiO_{1.0}$, wherein R is a monovalent organofunctional group, and the Q unit represents tetrafunctional siloxane unit represented by $RSiO_{2.0}$, wherein R is a monovalent organic group.

The organofunctional group R coupled to the polyalkylsilsesquioxane may include alkyl group having 1 to 20 carbon atoms such as but not limited methyl group, ethyl group, propyl group, butyl group, hexyl group, decyl group, octyl group, dodecyl group, octadecyl group, and the like, and mixtures thereof, for example, polymethylsilsesquioxane.

The polyalkylsilsesquioxane of the present invention may have an average particle size of about 0.1 to about 10 μm, for example, about 1 to about 4 μm, and as another example, 2 to about 3 μm. In this case, compatibility with other components in the composition may be excellent, mechanical physical properties such as impact strength, and the like, may be improved, and an extinction effect may be expressed with minimal or no deterioration of conductivity.

The polyalkylsilsesquioxane may be prepared by a known method without any limitation. For example, polyalkylsilsesquioxane may be obtained by hydrolyzing organotrialkoxysilane under an acidic condition, mixing an aqueous alkaline solution into water or water/organic solvent of organosilane triol, and polycondensing organosilane triol, wherein particle size and particle size distribution thereof may be controlled by adjusting pH of the aqueous alkaline solution.

The composition of the present invention may be prepared by mixing the components together and performing extrusion molding, but the present invention is not limited thereto.

The present invention provides a molded article including a conductive sheet manufactured by the conductive sheet composition. The molded article may have significantly excellent surface resistance and excellent mechanical physical properties such as impact strength, elongation, and the like, and in particular, may express an extinction effect to reduce surface gloss, thereby preventing malfunction of a sensor at the time of being applied to a manufacturing process of an electronic product to increase process reliability.

Here, the conductive sheet may have an average gloss at 60 degrees of an injection sample having a size of 10 cm×10 cm×3.2 mm, measured by Glossmeter (SUGA Test Instruments Co., Ltd., UGV-6P) of about 80 or less.

Hereinafter, the following Examples will be provided in order to describe the present invention in more detail. However, the present invention is not limited to the following Examples.

Specifications of each component used in the following Examples and Comparative Examples are as follows.

(A) Polycarbonate Resin

A bisphenol A type polycarbonate resin (Teijin L-1225) is used.

(B) Rubber-Modified Vinyl-Based Graft Copolymer 50 part by weight of potassium oleate, 0.4 parts by weight of cumene hydroperoxide, 0.2 parts by weight of n-octyl mercaptan, 0.4 parts by weight of glucose, 0.01 part by weight of iron sulfate hydrate and 0.3 parts by weight of sodium pyrophosphate are added to a mixture containing 50 parts by weight of butadiene rubber latex solid, 36 parts by weight of styrene, 14 parts by weight of acrylonitrile and 150 parts by weight of deionized water. The mixture is reacted at 75° C. for 5 hours to prepare a graft copolymer resin. 0.4 parts by weight of sulfuric acid is added to the obtained resin solid and then solidified to prepare a grafted acrylonitrile-butadiene-styrene copolymer (g-ABS) in a powder state.

(C) Carbon Nanotube

A multi-walled carbon nanotube having an average diameter of 15 nm and an average length of 8 μm (Hanhwa Chemical hanos CM-130) is used.

(C') Carbon Black

A carbon black (250 grade of TIMCAL Graphite & Carbon) is used.

(D) Silicone Particle

Polymethylsilsesquioxane particles having an average particle size of 2 μm (Samsung SDI Chemicals & Electronic Materials SL-200M) is used.

EXAMPLES 1 TO 3

Each component in an amount (based on part by weight) shown in the following Table 1 is mixed in a tumbler mill for 5 minutes, and then extruded in a general twin axis extruder at a range of 280 to 300° C. The extruded resin is dried at 100 to 120° C. for 4 hours, and extruded as a sheet at 280 to 310° C. to prepare a sample. Physical properties of the sample are evaluated by the following method, and results thereof are shown in the following Table 1.

COMPARATIVE EXAMPLES 1 TO 9

Comparative Examples 1 to 9 are practiced by the same method as Example 1 above except for adding the components in an amount (based on part by weight) shown in the following Table 2, and results thereof are shown in the following Table 2.

(Physical Properties Evaluation)

1) Notched Izod Impact Strength (kgf·cm/cm)

Notched Izod Impact Strength is measured on a ⅛" sample according to ASTM D256.

2) Surface Resistance (ohm/sq)

Surface Resistance is measured according to ASTM D257 using SRM-100 of Wolfgang Warmbier GmbH & Co. KG.

3) Surface Gloss

An average gloss at 60 degrees is measured by a Digital variable glossmeter (SUGA Test Instruments Co., Ltd., UGV-6P).

TABLE 1

| | Example 1 | Example 2 | Example 3 |
|---|---|---|---|
| (A) | 100 | 100 | 100 |
| (B) | 5 | 5 | 5 |
| (C) | 1.3 | 1.3 | 1.5 |
| (D) | 1 | 2 | 2 |
| Notched Impact Strength (kg · cm/cm) | 64 | 64 | 38 |
| Surface Resistance (ohm/sq) | $10^4$ | $10^4$ | $10^4$ |
| Surface Gloss | 65 | 47 | 43 |

TABLE 2

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| (A) | 100 | 100 | 100 | 100 | 100 | 100 | 100 | 100 | 100 |
| (B) | 5 | 5 | 5 | 7 | 7 | 5 | 5 | 7 | 7 |
| (C') | 10 | 20 | 10 | 10 | 0 | 0 | 0 | 0 | 0 |
| (C) | 0 | 0 | 0 | 0 | 1.3 | 1.5 | 1.5 | 0.1 | 10 |
| (D) | 0 | 0 | 2 | 2 | 0 | 0.1 | 10 | 2 | 2 |
| Notched Impact Strength (kg · cm/cm) | 16 | 4.5 | 30 | 31 | 16 | 15 | — | 30 | — |

TABLE 2-continued

| | Comparative Example 1 | Comparative Example 2 | Comparative Example 3 | Comparative Example 4 | Comparative Example 5 | Comparative Example 6 | Comparative Example 7 | Com-parative Example 8 | Com-parative Example 9 |
|---|---|---|---|---|---|---|---|---|---|
| Surface Resistance (ohm/sq) | $10^{7-8}$ | $10^4$ | $10^{7-8}$ | $10^{7-8}$ | $10^4$ | $10^4$ | — | — | — |
| Surface Gloss | 92 | 95 | 78 | 76 | 68 | 70 | — | 75 | — |

As seen from Tables 1 and 2, Examples 1 to 3 according to the present invention may show high surface resistance without deterioration of impact strength and reduce surface gloss as compared to Comparative Examples. Meanwhile, since Comparative Examples 1 to 4 include carbon black in a higher amount as compared to carbon nanotubes, surface resistance and impact strength are deteriorated and surface gloss is not reduced. In addition, Comparative Examples 5, 6 and 8 include carbon nanotubes or silicone particles outside of the range of the present invention, such that surface resistance is low or impact strength is deteriorated. Comparative Examples 7 and 9 could not be molded.

The conductive sheet composition according to the present invention may increase conductivity, improve mechanical physical properties such as impact strength, elongation, and the like, and reduce the surface gloss through the extinction effect to improve reliability at the time of being applied to a manufacturing process of an electronic product.

In addition, according to the present invention, the excessive amount of the filler contained in the conductive sheet or the film can be significantly reduced, such that dust due to surface particles may be prevented and environmental problems caused by harmful materials may be overcome.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A molded article comprising a conductive sheet manufactured using a conductive sheet composition comprising:

about 1 to about 10 parts by weight of a rubber-modified vinyl-based graft copolymer (B), about 0.5 to about 5 parts by weight of a carbon nanotube (C) having an average diameter of about 0.5 to about 100 nm and an average length of about 0.01 to about 100 μm, and about 0.5 to about 5 parts by weight of a silicone particle (D) having an average particle size of about 0.1 to about 10 μm, based on about 100 parts by weight of a polycarbonate resin (A), wherein the molded article has an average gloss at 60 degrees of an injection sample having a size of 10 cm×10 cm×3.2 mm, measured by Glossmeter (SUGA Test Instruments Co., Ltd., UGV-6P), of 65 or less and a notched Izod impact strength measured on a ⅛" sample according to ASTM D256 of 38 to 64 kg·cm/cm.

2. The molded article of claim 1, wherein the silicone particle (D) comprises polyalkylsilsesquioxane.

3. The molded article of claim 1, wherein the polycarbonate resin (A) has a weight average molecular weight (Mw) of about 10,000 to about 200,000 g/mol.

4. The molded article of claim 1, wherein the rubber-modified vinyl-based graft copolymer (B) is prepared by graft polymerization of a monomer mixture including a rubber polymer, an aromatic vinyl compound and a vinyl cyanide compound.

5. The molded article of claim 4, wherein the rubber-modified vinyl-based graft copolymer (B) is an acrylonitrile butadiene styrene (ABS) graft copolymer.

* * * * *